United States Patent
O'Donnell et al.

(10) Patent No.: US 6,223,203 B1
(45) Date of Patent: Apr. 24, 2001

(54) METHOD FOR PERFORMING PARALLEL MANAGEMENT OPERATIONS INCLUDING AND DELETING COMPUTER SYSTEMS

(75) Inventors: Michael D. O'Donnell; Danny B. Gross, both of Austin; Gene R. Toomey, Kyle, all of TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/185,935

(22) Filed: Nov. 4, 1998

(51) Int. Cl.[7] ................................................ G06F 15/16
(52) U.S. Cl. ...................... 709/102; 709/104; 709/106; 709/107
(58) Field of Search .................................. 709/100, 102, 709/104, 105, 106, 107

(56) References Cited

U.S. PATENT DOCUMENTS

| | | | |
|---|---|---|---|
| 5,193,186 | * 3/1993 | Tamaki et al. | 709/100 |
| 5,615,127 | * 3/1997 | Beatty et al. | 395/500.08 |
| 5,692,193 | * 11/1997 | Jagannathan et al. | 709/106 |
| 5,887,166 | * 3/1999 | Mallick et al. | 709/102 |

OTHER PUBLICATIONS

John S. Gray, "Interprocess Communications in UNIX® The Nooks and Crannies," Prentice Hall PTR, New Jersey, 1997, pp. 15–18, 53–68 (22 pages).

* cited by examiner

Primary Examiner—Viet D. Vu
(74) Attorney, Agent, or Firm—Skjerven Morrill MacPherson, LLP; Stephen A. Terrile

(57) ABSTRACT

The time required for executing a function over a network of computer systems in a high availability system is minimized. A list of computer systems is provided by a parent process. The list includes a plurality of computer systems upon which a first function is to be performed. The first function is received by the parent process. A plurality of child processes is sequentially created. Each of the child processes corresponds to one of the computer systems on the list. Each of the child processes executes in parallel with at least one other of the child processes. Each of the child processes remotely executes the first function on the computer system corresponding to the respective child process.

14 Claims, 2 Drawing Sheets

METHOD FOR PERFORMING PARALLEL MANAGEMENT OPERATIONS INCLUDING AND DELETING COMPUTER SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to computer systems and networks of computer systems, and, more particularly, to efficient, parallel execution of computer processes over multiple computer systems.

2. Description of the Related Art

Computer systems have attained widespread use in providing computing power to businesses and institutions. Some important fields in which computer systems have become common include manufacturing monitoring and control; electrical, mechanical, and chemical system design and simulation; and network management and service. Productive processing time is of great importance to the users of computer systems in these and other fields because computer system down time can result in significant costs.

Computer systems are designed to provide a degree of system availability that is necessitated by the applications for which the computer system is intended. High availability (HA) computer systems, as their name implies, are required to be available, or "on," virtally all of the time. Such computer systems (or networks of such computer systems) should be substantially error free or should be capable of recovery from errors. Also, consumption of resources and down time in such systems due to maintenance tasks should be minimized.

For example, in a 24×7 manufacturing system, time is extremely critical. Performance of management/ maintenance operations as quickly and efficiently as possible is extremely important. In such a manufacturing system, downtime for such operations can be very limited. For example, in one such manufacturing system, scheduled downtime may be as little as one hour per quarter. Therefore, the operations performed during these downtime periods must be optimized to run as quickly and efficiently as possible.

In an environment where scheduled downtime is extremely limited, it is imperative that operations be performed as quickly and accurately as possible. Also, in a client/server environment where hundreds of systems may be involved, the ability to execute the same command across all systems with minimal effort and in the shortest time possible is extremely important. When a common operation is to be performed across a group of systems, one of two methods is typically used. For example, management operations to be performed across many computer systems in a client/server environment are typically performed either manually on each system, one-by-one, or sequentially using a script. Manual execution on each system involves logging into each system and performing the command manually. This is time consuming and can result in errors and/or omissions. Sequential script execution typically includes bundling the work to be done into a script and then sequentially executing the scripted commands on all systems. If hundreds of systems are involved, this sequential method can also be very time consuming.

SUMMARY

It has been discovered that a method and software application may be used to facilitate dynamic, substantially parallel execution of operations on multiple computer systems over a distributed computing system such as a semiconductor processing system. The application and method thereof defines a set of systems upon which each operation is to be executed and then performs each operation in a substantially parallel fashion. Such an application and method thereof allow system administrators to execute operations across a set of systems substantially in parallel and without writing sequentially executed scripts of the operations. Consequently, system management operations are performed across a multitude of systems in a fast and efficient manner, thereby decreasing system down time.

In one embodiment, a method of minimizing the time required for executing a function over a network of computer systems in a high availability system is provided. A list of computer systems is provided by a parent process. The list includes a plurality of computer systems upon which a first function is to be performed. The first function is received by the parent process. A plurality of child processes is sequentially created. Each of the child processes corresponds to one of the computer systems on the list. Each of the child processes executes in parallel with at least one other of the child processes. Each of the child processes remotely executes the first function on the computer system corresponding to the respective child process.

In another embodiment of the invention, a computer program product encoded in computer readable media is provided. The computer program product includes first, second, third and fourth instructions executable on a computer system. The first instructions are for providing a list of computer systems by a parent process. The list includes computer systems upon which a first function is to be performed. The second instructions are for receiving the fist function by the parent process. The third instructions are for sequentially creating child processes. The fourth instructions are for executing each of the child processes in parallel with at least one other of the child processes. Each of the child processes remotely execute the first function on a computer system corresponding to the respective child process.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following description is intended to provide a detailed description of an example of the invention and should not be taken to be limiting of the invention itself. Rather, any number of variations may fall within the scope of the invention which is defined in the claims following the description.

In one embodiment of the invention, a distributed computing system includes a system management server coupled to various compute servers via a network coupling. A system management program initiates a system management process on the system management server to enable a system manager to define a list of computer systems coupled within the distributed computing system and to execute commands in parallel on the listed computer systems. The system management process causes common commands to be executed across multiple computer systems after receiving a command to perform an operation and a list of one or more systems upon which to perform the operation. Using local commands executing on the system management computer system, the system management process allows a user to define a list of computer systems upon which the operation is to be performed. Computer system names may be added to a list interactively or by loading computer system names from file. Once the list of computer systems is defined, the command to be executed is supplied to the system management process. The command is then executed on each of the listed computer systems in a virtually parallel fashion.

Implementing a system management software application that allows a command to be executed in parallel on multiple computer systems greatly reduces the time required to perform common system management operations. For example, a file copy of a ten kilobyte file to 100 systems can take approximately two minutes using a sequential method. Using the parallel execution method and/or application described herein, such a copy operation can take less than fifteen seconds. Also for example, such a method and/or application therefor to execute a common function such as a factory systems restart can reduce the restart period from approximately 30 minutes down to 15 minutes.

Figure 1:
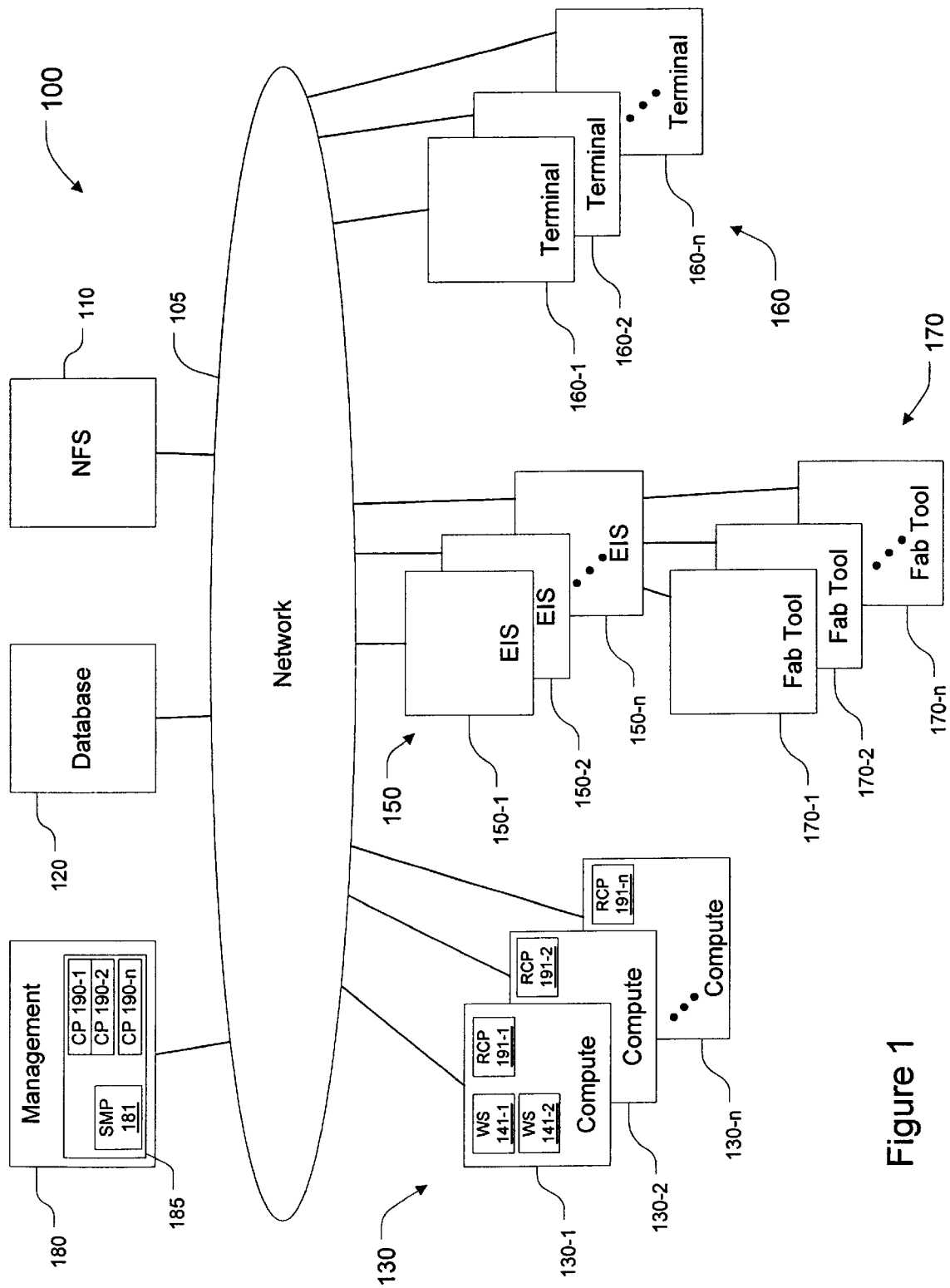
FIG. 1 shows a block diagram of an embodiment of a distributed computing system according to the invention.

Referring to FIG. 1, a distributed computing system 100 such as a semiconductor processing system includes various computer systems which are coupled via network coupling 105 to execute various subtasks of system 100. For example, system 100 includes NFS server 110, database server 120, compute servers 130, equipment interface servers 150, and terminals 160. Network 105 may be an Ethernet coupling, a fiber distributed data interface (FDDI) coupling, or any other expedient for coupling the computer systems of system 100. Compute servers 130 include at least one compute server such as compute servers 130-1, 130-2 and 130-n. Equipment interface servers 150 include at least one equipment interface server (EIS) such as EIS 150-1, EIS 150-2 and EIS 150-n. Terminals 160 include at least one terminal such as terminals 160-1, 160-2 and 160-n. System 100 further includes at least one fab tool coupled to the equipment interface servers 150. For example, fab tools 170 include tools 170-1, 170-2 and 170-n coupled to EIS 150-1. Fab tools 170 are coupled to EIS 150-n via any appropriate coupling such as a network, RS-232 standard connection, or any other appropriate expedient(s). System 100 further includes management server 180 for managing the various computer systems and processes of system 100.

Database server 120 typically has high availability requirements and is accessible by multiple remote users of computer systems coupled within system 100. Computer systems such as database server 120 are often used to facilitate general manufacturing monitoring and control. For example, database server 120 provides information regarding semiconductor manufacturing tools (e.g., fab tools 170) and facilitates control and/or automation of semiconductor manufacturing tools and/or systems by users in a semiconductor manufacturing facility or fab.

Each of compute servers 130 includes various work sessions. For example, compute server 130-1 includes work sessions 141-1, 141-2. Work sessions 141-1, 141-2 facilitate control of the operation of one or more of fab tools 170. In operation, a terminal user initiates a semiconductor application work session on one of compute servers 130 from one of terminals 160. Thus, for example, work sessions 141-1, 141-2 are initiated from terminal 160-1 and use computer resources of compute server 130-1. Each work session accesses a semiconductor processing database on database server 120 to read and write information regarding the operation of fab tools 170. Each work session provides control information to fab tools 170 via equipment interface servers 150 and returns status information to database server 120. For example, a user of terminal 160-1 initiates work session 141-1 on compute server 130-1 to control fab tool 170-1 and to receive and provide information regarding the operation of fab tool 170-1.

Management server 180 is used by system managers to manage the various computer systems and processes of system 100. Management server 180 includes memory 185 which includes system management program 181. As described hereinafter, system management program 181 initiates child processes 190-1, 190-2 ... 190-n to remotely perform a function by remote child processes 191-1, 191-2 ... 191-n on compute servers 130-1, 130-2 ... 130-n, respectively. The function is performed on each of compute servers 130 in a substantially parallel fashion in accordance with the invention.

System 100 provides a semiconductor manufacturing and processing management system for managing information distribution, system control and automation of manufacturing processes in a semiconductor fabrication facility. System 100 operates using the WorkStream factory shop floor application which is available from Consilium, Inc. of Mountain View, Calif. WorkStream is used to drive the manufacturing functions within a semiconductor manufacturing facility or fab. WorkStream facilitates management of the execution of production plans for manufacturing operations by providing control of work instructions to users and by providing control of automated equipment. WorkStream also facilitates recording product genealogies and work conditions.

WorkStream users initiate WorkStream work sessions on compute servers 130 from terminals 160. Each WorkStream work session accesses database server 120 to read and write information to database 150 regarding the operation of fab tools 170. Each WorkStream work session provides control information to fab tools 170 via equipment interface servers 150 and returns status information to database server 120.

Up to ten and sometimes more compute servers 130 are coupled to network 105, and up to thirty and sometimes more terminals 160 are coupled to each of the compute servers 130 via network 105. Such a system 100 can support over 1000 work sessions initiated, for example, by users of terminals 160 and executed on compute servers 130 to control and provide information regarding the operation of fab tools 170. Thus, for example, more than 100 WorkStream work sessions may be executing on each of the compute servers 130 from the terminals 160 coupled thereto. In such a computing environment, the ability to quickly and efficiently execute common operations over multiple computer systems becomes especially important due to the high availability nature of system 100.

Figure 2:
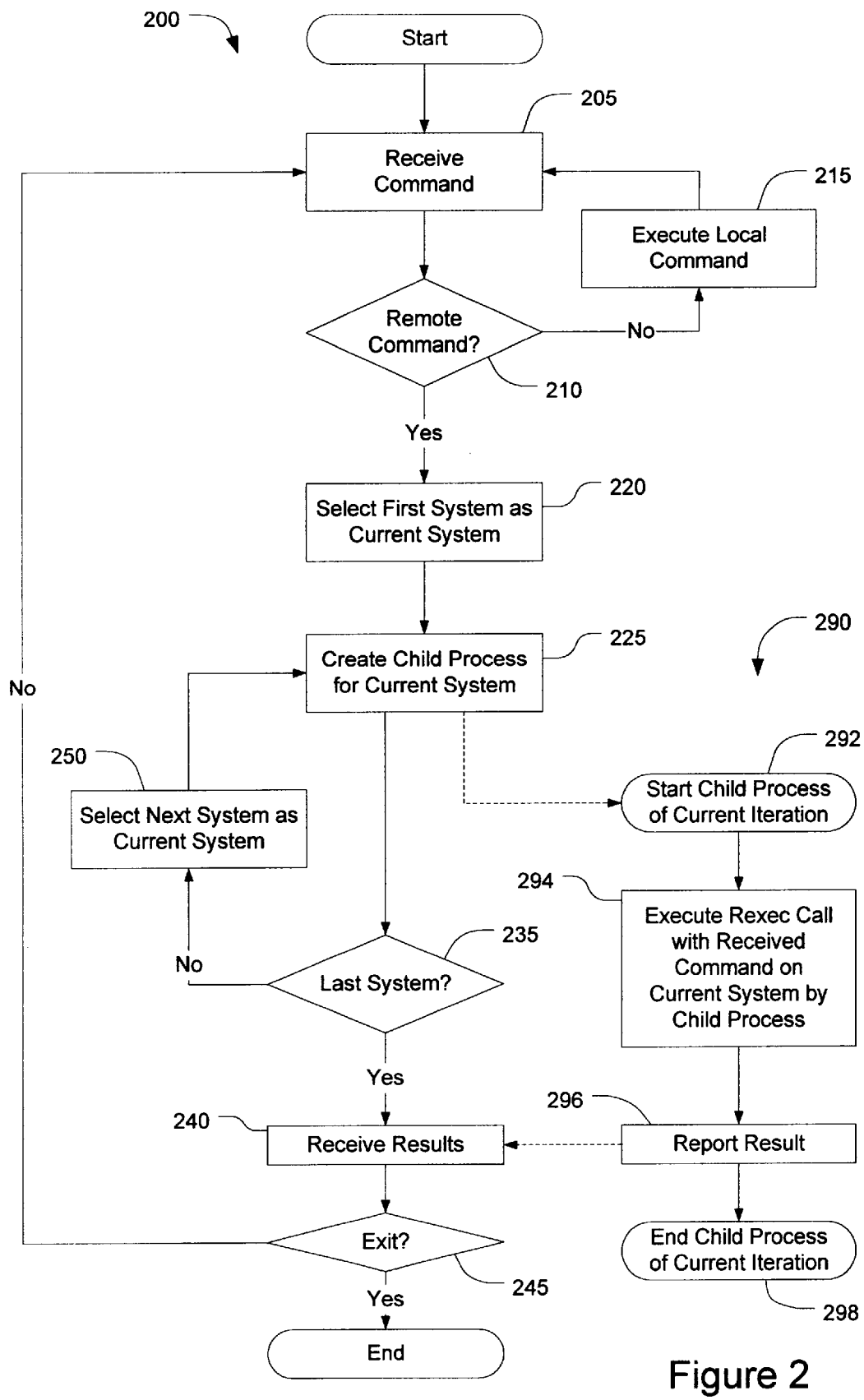
FIG. 2 shows a flow chart of an embodiment of a parallel execution module and/or operation according to the invention.

FIG. 2 depicts a flow chart of a parallel execution module and/or operation 200 according to the invention. The invention is described hereinafter with reference to an exemplary embodiment including various operations. Such operations are typically performed by software module(s) such as a software application and/or subroutines thereof For example, management server 180 includes system management program 181 which initiates a system management process in active memory of management server 180 for performing substantially parallel execution of management subprocesses.

During receive command operation 210, a command is received for processing by system management program 181. Exemplary system management program 181 provides a command line driven user interface which prompts the user for various commands for subsequent processing by system management program 181. For example, system management program 181 displays a prompt such as "RCMD>" to the user. At the prompt the user can type in one of several function names such as local function calls or a function call including a remote function to be executed on each of various selected computer systems of system 100.

After receive command operation 205 and during remote command decision 210, system management program 181 determines whether the received command is a local command or a command for remote execution on multiple computer systems (referred to herein as a remote command). If the received command is a local command, control transitions to execute local command operation 215. If the received command is a remote command, control transitions to select first system operation 220.

During execute local command operation 215, system management program 181 executes the received command on management server 180. For example, system management program 181 includes various local functions which are executed responsive to the user inputting a corresponding local command at a prompt. Exemplary local commands include system management commands, display management commands, and command execution commands.

System management commands are those commands that are used to add or delete system names from a remote system list that is maintained by the program.

The remote system list is a list of computer systems of system 100 upon which a common remote function is to be performed. The "add" command allows a single system to be added to the remote system list. The "delete" command allows a single system to be removed from the remote system list. The "clear" command deletes all systems from a remote system list. The "load" command allows a list of systems to be read in from a file.

Display management commands allow the user to specify that a window be opened for one or more systems to display the output of the command being executed on the system. For example, the "display" command is used to turn on/off the display for one or more systems. The "logging" command allows output to the display window to be toggled on or off.

Command execution commands are used to affect the actual command to be run on the remote system list. For example, the "username" command allows the user to specify the username under which the remote command should be executed. The "go" command is where the actual command to be executed is supplied.

Exemplary system management program 181 also includes various miscellaneous commands such as "help" and "exit." The miscellaneous commands are used to provide help for each command and to exit the program.

Once the remote system list has been determined using the above described local, system management commands, the "go" command is used to identify a remote command which is to be run on each computer system on the remote system list. To perform the remote command on all listed systems in a virtually parallel fashion, system management program 181 progresses through the remote system list by setting a variable to the next system name on the list during operations 220, 225, 235, 250. Exemplary system management program 181 then creates a child process for each system included on the remote system list For example, a UNIX fork() system call creates a child process at operations 225, 292. This child process looks at the variable defining the current computer system upon which the command is to execute and remotely executes a function on the current computer system. For example, the child process performs a UNIX rexec() subroutine call which remotely executes the command on the current system. For example, if three systems are defined in the remote system list (e.g., computer systems 130-1, 130-2 and 130-n of FIG. 1), one child process is created for each system resulting in a total of three child processes (e.g., child processes (CPs) 190-1, 191-2 and 190-n of FIG. 1) after the "go" command is entered. The remotely executing function is represented by remote child processes (RCPs) 191-1, 191-2 . . . 191-n. Each child process executes without regard to whether the process created before it has completed and therefore typically executes concurrently with at least one of the other child processes and often with some or all of the other child processes. Each child process uses the rexec() subroutine call to execute the received remote command on the corresponding system.

Referring again to FIG. 2, during select first system operation 220, system management program 181 selects a computer system of system 100 as the current system. The current system is selected from the remote system list. For example, system management program 181 selects compute server 130-1.

After select first system operation 220 and during create child process operation 225, system management program 181 creates a child process corresponding to the currently selected system. The child process executes the remote command on the currently selected system. For example, child process 190-1 is created and executes a remote system call to execute the command on compute server 130-1. The operations of an exemplary child process is discussed hereinafter with reference to child process flow 290 which includes operations 292, 294, 296, 298.

After create child process operation 225 and during last system decision 235, system management program 181 determines whether there is another system on the remote system list. If there is a computer system upon which the remote command has not been executed, control transitions to select next system operation 250. For example, if compute server 130-2 is on the remote system list but has not been selected as the current computer system during an iteration of the loop including operations 225, 235, 250, control transitions to select next system operation 250. If there are no other computer systems upon which the remote command is to be executed, control transitions to receive results operation 240.

During select next system operation 250, system management program 181 selects another computer system from the remote system list. Continuing the above example, system management program 181 selects compute server 130-2 as the current computer system. After select next system operation 250, control transitions to create child process operation 225 so that a child process may be created for the next computer system which is the newly selected, current system. For example, child process 190-2 is created to execute a function on compute server 130-2.

Child process flow 290 shows operations of an exemplary child process of the multiple child processes executing on each of the computer systems on the first list. After start child process operation 292, and during execute remote command operation 294, the child process of the current iteration executes an rexec() system call with the received remote command on the corresponding, currently selected system. For example, child process 190-1 executes an rexec() system call to compute server 130-1 which initiates remote child process 191-1. After execute remote command operation 294, control of the child process transitions to report result operation 296. During report result operation 296, the child process reports results of the execution of the remote command on the currently selected system to the parent process and/or system management program 181. For example, a variable is returned with a value indicating the presence or lack of an error in the execution of the child process(es). The child process of the current iteration ends at end child process operation 298.

During receive results operation 240, system management program 181 receives results from each of the child processes created for each of the computer systems of system 100 upon which the remote command was executed. For example, a variable is returned with a value indicating the presence or lack of an error in the execution of the child process(es). Receive results decision may occur in parallel with or in between operations 225, 235, 250. After receive results operation 240 control of system management program 181 transitions to exit decision 245.

During exit decision 245, system management program 181 determines whether the system user wishes to exit system management program 181. If an exit command is received at the command line provided by system management program 181, operation of system management program 181 terminates. If an exit command is not received at the command line provided by system management program 181, and another command is received at the command line, control transitions to receive command operation 205.

The above description is intended to describe at least one embodiment of the invention. The above description is not intended to define the scope of the invention. Rather, the scope of the invention is defined in the claims below. Thus, other embodiments of the invention include various modifications, additions, and/or improvements to the above description.

In one embodiment, parallel execution operations are executed by source code provided in the Appendix filed herewith and incorporated by reference herein. Such a software application may be written for various UNIX operating systems (e.g., HP-UX, SunOS, Solaris, AIX, etc.) or may be written for any multitasking operating system. For example, in one embodiment, computer systems 110, 120, 130 and 160 operate under control of a UNIX type operating system. For example, compute servers 130 are Hewlett Packard Series 800 computer system running the HP-UX 9.04 type UNIX operating system. Such a computer system may function as a server for client computer systems. Terminals 160 are Xterminals and/or personal computer systems executing software such as Xwindows of PCNFS for managing sessions. It is understood that other computer systems, other UNIX operating systems (e.g., the International Business Machines AIX operating system), and other operating systems (e.g., the Windows NT operating system) may be used in accordance with the invention. Other embodiments may include mainframes, minicomputers, personal computer systems and/or terminals in place of some or all of the computer systems of system 100. Files are accessed by the computer systems of system 100 using the network file server (NFS) protocol. Other appropriate methods of making the files available to computer systems 110, 130, 140 and 160 may be used in accordance with the invention.

The system management program 181 need not be located on management server 180 as shown in FIG. 1. System management program 181 may execute on any computer system of system 100 which has access to the remote systems upon which the remote commands are to be executed.

The operations referred to herein may be modules or portions of modules (e.g., software, firmware or hardware modules). For example, although the various modules may include application specific hardware modules, the described embodiment includes software modules and/or includes manually entered user commands. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule. Furthermore, those skilled in the art will recognize that the operations given in the exemplary embodiment are for illustration only. Operations may be combined or the functionality of the operations may be distributed in additional operations in accordance with the invention.

Each of the blocks of FIG. 2 may be executed by a module (e.g., a software module) or a portion of a module or a computer system user. Thus, the above described parallel execution method, the operations thereof and modules therefor may be executed on a computer system configured to execute the operations of the method and/or may be executed from a computer-readable storage medium. The method may be embodied in a machine-readable or computer-readable storage medium for configuring a computer system to execute the method. A computer-readable storage medium such as storage 185 of server 180, for example, can include storage devices such as floppy disks, hard drives, optical disks (e.g., CD-ROM, CD-R, etc.), semiconductor-based memory units including FLASH memory, EEPROM, EPROM, ROM or RAM or application specific integrated circuits. Storage 180 and other storage may be permanently, removably or remotely coupled to servers 180 or any other computer system of system 100. Thus, the software modules may be stored within a computer system memory to configure the computer system to perform the functions of the module. Other new and various types of computer-readable storage media may be used to store the software modules discussed herein. Furthermore, the software modules may be received by computer system 180, for example, from computer readable media including any of magnetic storage media, including disk and tape storage media; optical storage media, including compact disk memory and digital video disk storage media, nonvolatile memory storage memory; volatile storage media; and data transmission media including computer network, point-to-point telecommunication, and carrier wave transmission media.

The invention has been described in the context of system 100. In such a system, each of a plurality of semiconductor manufacturing computer systems provides information, control and/or automation to semiconductor manufacturing tools, systems and/or users in a semiconductor manufacturing facility. Thus, in one embodiment, parallel execution is provided in a computer network which provides information, control and automation of semiconductor manufacturing processes. Other embodiments include other types of distributed computing systems. The distributed computing system need not be a manufacturing control system. Any distributed computing system is especially benefited by the above described parallel execution method and/or module(s).

Although specific examples of computer systems 110, 120, 130, 140, 150 and 160 are shown in FIG. 1 as included within the exemplary system 100, other embodiments of the invention may include an information processing network having any number of computer systems in other appropriate network configuration. Furthermore, the functionality of the various computer systems may differ from the computer systems of exemplary system 100. System 100 may include additional computer systems of different types or combinations, or the functions of several of the servers may be combined into fewer servers.

A computer system processes information according to a program and produces resultant output information via the I/O devices. A program is a list of internally stored instructions such as a particular application program and/or an operating system. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

A computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

Computer systems are often coupled to other computer systems to form a network to facilitate the exchange and handling of information. A computer network typically includes a group of computer systems and associated hardware devices (e.g., physical connections) and software applications (e.g., communications protocol programs and data). A computer network may include multiple computer processes executing on several computer systems as a distributed multiprocessing platform in which the several computer systems are accessible by each of the computer processes. Additionally, multiple computer processes executing on the same computer system often communicate with each other in a similar fashion as multiple computer processes executing on different computer systems. Consequently, it often makes sense to discuss interaction between computer processes instead of, or in addition to, interaction between computer systems.

Also, the variable identifier "n" is used in several instances in FIG. 1 to more simply designate the final element (e.g., compute server 130-n, terminal 160-n, etc.) of a series of related or similar elements (e.g., compute servers 130, terminals 160, etc.). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "n" may hold the same or a different value than other instances of the same variable identifier. For example, compute server 130-n may be the tenth compute server in a series of compute servers, whereas terminal 160-n may be the fiftieth terminal in a series of terminals.

Also, with regard to the above described computer processes, system 100 may include the active computer processes 181, 190-1, 190-2 . . . 190-n, 191-1, 191-2 . . . 191-n executing during the above described operations. System 100 may include modules/programs for executing the computer processes stored in memory of computer systems of system 100 when system 100 is not filly operational.

The above description is not intended to present an exhaustive list of embodiments of the invention. Although an attempt has been made to outline some exemplary embodiments and exemplary variations thereto, other embodiments and/or variations are within the scope of the invention as defined in the claims below.

What is claimed is:

1. A method of minimizing the time required for executing a function over a network of computer systems in a high availability system, the method comprising:

providing a list of computer systems by a parent process, the list including a plurality of computer systems upon which a first function is to be performed, the providing including providing a user interface for accepting:
adding a computer system to the list;
deleting a computer system from the list.;
receiving the first function by the parent process;
sequentially creating a plurality of child processes, each of the child processes corresponding to one of the computer systems on the list; and
executing each of the child processes in parallel with at least one other of the child processes, each of the child processes remotely executing the first function on a computer system corresponding to the respective child process.

2. The method of claim 1, wherein the sequentially creating the child processes comprises:

designating a current computer system from the list of computer systems, the computer system being designated as the current computer system being a computer system that has not yet been designated as the current computer system;
creating a child process for the current computer system;
repeating the designating and the creating while the list includes a computer system which has not yet been designated as the current computer system.

3. The method of claim 1, wherein the sequentially creating the child processes comprises:
- selecting a current computer system from the list;
- initiating a loop including:
  - creating a child process for the current computer system;
  - selecting a next computer system from the list of computer systems as the current computer system, the next computer system being a computer system that has not yet been designated as the current computer system;
  - exiting the loop when the list includes no computer systems which have not yet been selected as the current computer system.

4. The method of claim 1, wherein each of the child processes reports the success or failure to the parent process of the execution of the first function on the computer system corresponding to each child process.

5. A computer program product encoded in computer readable media, the computer program product comprising:
- first instructions, executable on a first computer system, for providing a list of computer systems by a parent process, the list including computer systems upon which a first function is to be performed, the first instructions including instructions,
- executable on the first computer system, for providing a user interface for accepting:
  - adding a computer system to the list;
  - deleting a computer system from the list;
- second instructions, executable on the first computer system, for receiving the first function by the parent process;
- third instructions, executable on the first computer system, for sequentially creating child processes; and
- fourth instructions, executable on the first computer system, for executing each of the child processes in parallel with at least one other of the child processes, each of the child processes remotely executing the first function on a computer system corresponding to the respective child process.

6. The method of claim 1, wherein the providing the list further comprises:
- providing the user interface for accepting the following functions:
  - loading a list of systems from a file.

7. The method of claim 1, wherein the receiving the first function by the parent process comprises:
- accepting an execute command by the user interface, the execute command including an argument identifying the first function.

8. The method of claim 7, wherein the receiving the first function by the parent process further comprises:
- accepting a username command by the user interface, the username command specifying a username under which the first function should be executed.

9. The method of claim 1, wherein the user interface application is one of the group consisting of:
- a command line driven application; and
- an graphical icon selection driven application.

10. The computer program product of claim 5 wherein the third instructions comprise:
- fifth instructions, executable on the first computer system, for designating a current computer system from the list of computer systems, the computer system being designated as the current computer system being a computer system that has not yet been designated as the current computer system;
- sixth instructions, executable on the first computer system, for creating a child process for the current computer system;
- seventh instructions, executable on the first computer system, for repeating the fifth and sixth instructions while the list includes a computer system which has not yet been designated as the current computer system.

11. The computer program product of claim 5 wherein each of the child processes reports the success or failure to the parent process of the execution of the first function on the computer system corresponding to each child process.

12. The computer program product of claim 5 wherein the second instructions comprise:
- ninth instructions, executable on the first computer system, for accepting an execute command by the user interface, the execute command including an argument identifying the first function.

13. The method of claim 5, wherein the user interface application is one of the group consisting of:
- a command line driven application; and
- an graphical icon selection driven application.

14. The computer program product of claim 5 wherein the computer readable media includes any of magnetic storage media, including disk and tape storage media; optical storage media, including compact disk memory and digital video disk storage media; nonvolatile memory storage memory; volatile storage media; and data transmission media including computer network, point-to-point telecommunication, and carrier wave transmission media.

* * * * *